United States Patent
Varela et al.

(10) Patent No.: US 7,093,843 B2
(45) Date of Patent: Aug. 22, 2006

(54) KING PIN ARRANGEMENT FOR STEERING KNUCKLE

(75) Inventors: Tomaz Dopico Varela, Gahanna, OH (US); Duy T. Lam, Baltimore, OH (US)

(73) Assignee: ArvinMeritor Technology LLC, Troy, MI (US)

( * ) Notice: Subject to any disclaimer, the term of this patent is extended or adjusted under 35 U.S.C. 154(b) by 167 days.

(21) Appl. No.: 10/437,709

(22) Filed: May 14, 2003

(65) Prior Publication Data

US 2004/0227319 A1 Nov. 18, 2004

(51) Int. Cl.
*B62D 7/18* (2006.01)

(52) U.S. Cl. .................................... 280/93.512

(58) Field of Classification Search ........... 280/93.512, 280/124.125; 301/132
See application file for complete search history.

(56) References Cited

U.S. PATENT DOCUMENTS

| | | | |
|---|---|---|---|
| 3,820,907 A * | 6/1974 | Hassan | 403/27 |
| 4,690,418 A * | 9/1987 | Smith | 280/93.512 |
| 4,915,530 A * | 4/1990 | Tomlinson | 403/158 |
| 5,219,176 A | 6/1993 | Mitchell | |
| 5,785,332 A | 7/1998 | Pollock et al. | |
| 6,029,986 A | 2/2000 | Bodin et al. | |
| 6,419,250 B1 | 7/2002 | Pollock et al. | |
| 6,471,224 B1 | 10/2002 | Ziech | |
| 6,499,752 B1 | 12/2002 | Davis | |
| 6,502,839 B1 * | 1/2003 | Chino et al. | 280/93.512 |
| 6,607,203 B1 * | 8/2003 | Bodin | 280/93.512 |
| 2003/0075892 A1 * | 4/2003 | Tisch et al. | 280/93.512 |

FOREIGN PATENT DOCUMENTS

| | | |
|---|---|---|
| EP | 0 854 817 B | 12/2001 |
| EP | 0 973 670 B | 7/2002 |
| JP | 2002120708 A * | 4/2002 |

OTHER PUBLICATIONS

European search report, dated Jun. 22, 2005.

\* cited by examiner

*Primary Examiner*—David R. Dunn
(74) *Attorney, Agent, or Firm*—Carlson, Gaskey & Olds

(57) ABSTRACT

A steering knuckle assembly provides a tapered roller bearing on the bottom and a needle bearing on the top of a king pin. A spring cap preloads the tapered roller bearing. The king pin includes a step on the upper portion to transfer the spring cap preload force to the top of an axle beam.

17 Claims, 1 Drawing Sheet

KING PIN ARRANGEMENT FOR STEERING KNUCKLE

BACKGROUND OF THE INVENTION

The present invention relates to a steering knuckle and, more particularly, to a mounting arrangement for a king pin therefor.

Heavy-duty vehicles commonly include multiple drive axle assemblies and non-drive steering axles. A wheel end assembly is supported on a steering knuckle, which is supported on an axle assembly. The steering knuckle pivots upon a king pin to provide steering. Conventional king pin arrangements usually include a combination of bushings of either metallic or synthetic material and thrust bearings.

King pins and bushings are high wear components and typically require replacement every few hundred thousand miles. Frequent maintenance such as re-greasing to flush out wear particles and contamination may also be regularly required.

Other king pin arrangements replace some or all bushings with needle bearings. Still other king pin arrangements utilize thrust bearings, taper roller bearings, thrust roller bearings, or various combinations thereof.

Over time, these conventional king pin arrangements may develop some level of end play which may detrimentally affect lubrication seals resulting in increased wear and further exacerbation of end play. Furthermore, conventional king pin arrangements may not provide for long term lubrication without use of a relatively large king pin diameter and a press fit of the king pins into the axle beam. Such an arrangement may be relatively heavy and difficult to manufacture.

Accordingly, it is desirable to provide a relatively small diameter king pin arrangement which provides long life with minimal maintenance.

SUMMARY OF THE INVENTION

The steering knuckle assembly according to the present invention provides a single tapered roller bearing on the bottom and a needle bearing on the top boss of a king pin. The needle bearing effectively eliminates the heretofore necessary larger king pin diameter otherwise utilized to reduce deflection/misalignment. The tapered roller bearing location below the king pin allows the bearing cone to creep, which increases the life of the bearing, since the load/rollers will not oscillate over the same portion of the bearing race.

A spring cap preloads the tapered roller bearing which greatly reduces end play that reduces seal life. The preload also minimizes brinelling of the tapered roller bearing. The spring cap preload is tailored to produce a controlled amount of Coulomb friction to dampen vibration conditions typical of roller bearings. The king pin includes a step on the upper portion to transfer the spring cap preload force to the top of an axle beam.

The present invention therefore provides a relatively small diameter king pin arrangement which provides long life with minimal maintenance.

BRIEF DESCRIPTION OF THE DRAWINGS

The various features and advantages of this invention will become apparent to those skilled in the art from the following detailed description of the currently preferred embodiment. The drawing that accompanies the detailed description can be briefly described as follows.

DETAILED DESCRIPTION OF THE PREFERRED EMBODIMENT

Figure 1:
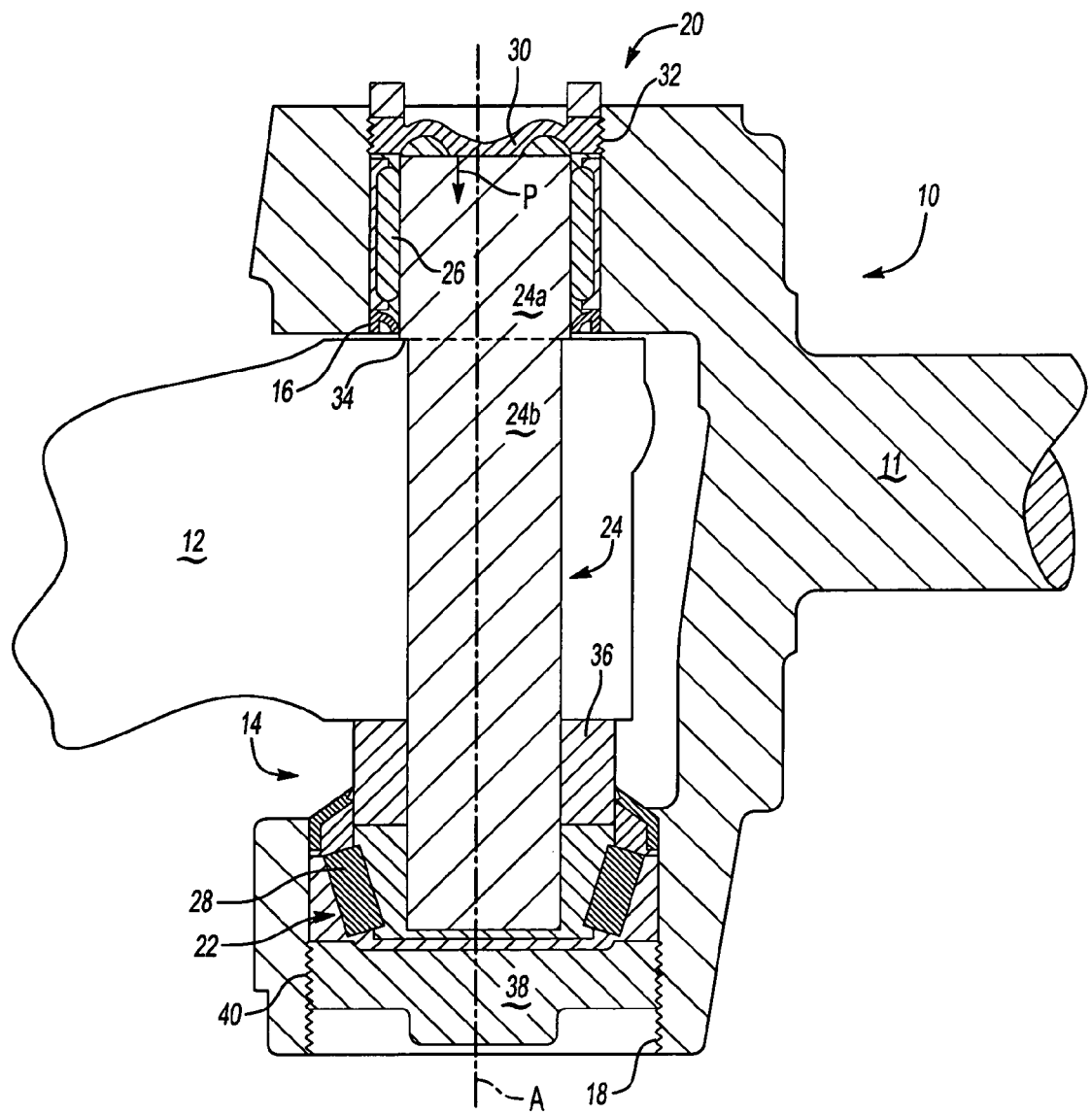
FIG. 1 is a partial cross-sectional view of a front axle steering knuckle assembly.

FIG. 1 illustrates a general perspective view of a steering knuckle assembly 10. The steering knuckle assembly 10 includes a support structure such as a knuckle 11 mounted to an axle beam 12 through a king pin arrangement 14 for rotation about an axis A. It is to be understood that the axle beam 12 may be any suitable vehicle support structure.

The knuckle 11 includes an upper cavity 16 and a lower cavity 18 on opposing portions of the knuckle 11. It should be understood that relative positional terms such as "forward," "aft," "upper," "lower," "above," "below," and the like are with reference to the normal operational attitude of the vehicle and should not be considered otherwise limiting. The cavities 16, 18 are preferably cylindrical threaded bores, however, other cavities and receipt members will benefit from the present invention. The cavities 16, 18 receive an upper king pin mount 20 and a lower king pin mount 22 to retain a king pin 24.

The upper cavity 16 retains a needle bearing 26 for rotation about the king pin 24. The needle bearing 26 effectively reduces the heretofore relatively large king pin diameter. A larger king pin diameter is often utilized in conventional knuckles to reduce deflection/misalignment, since the movement arm is substantially reduced as compared to a conventional needle bearing installation on the lower portion, where a thrust bearing operates as a spacer between the beam boss and the needle bearing.

The lower cavity 18 retains a tapered roller bearing 28 for rotation of the king pin 24 therein. The tapered roller bearing 28 location below the king pin 24 allows the bearing cone to creep. Creeping increases the life of the bearing 28, as the load/rollers do not oscillate over the same spot of the bearing race. That is, existing designs with the tapered roller bearing on the top boss require the bearing cone to be clamped against the top of the beam in an attempt to prevent creeping to minimize end play.

A spring cap 30 is preferably threaded into the upper cavity 16 which includes corresponding threads 32. The spring cap 30 preloads (illustrated schematically by arrow P) the tapered roller bearing 28 which greatly reduces end play that may otherwise reduce seal life. The preload P also minimizes brinelling of the tapered roller bearing. The spring cap 30 preload P is preferably tailored to produce a controlled amount of Coulomb friction to dampen vibration conditions typical roller bearing and king pin interfaces. It should be understood that other mechanical locks, shims, spacers and other methods may alternatively or additionally be used to adjust bearing pre-load.

The king pin 24 preferably includes a step 34 on the upper portion to transfer the spring cap 30 preload force to the top of the axel beam 12. That is, an upper segment 24a of the king pin 24 is of a larger diameter than the king pin segment 24b which fits into the axle beam 12. It should be understood that usage of additional or alternative steps and or diameters allows the king pin arrangement 14 of the present invention to be interchangeable with existing axle beams, without the manufacture of special bearing sizes.

A spacer 36 is preferably mounted between tapered roller bearing 28 and the axle beam 12. An adjustment nut 38 is threaded into the lower cavity 18 which includes corresponding threads 40. Positing of the spring cap 30 and the adjustment nut 38 permits application and adjustment of the preload to the king pin 24.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A king pin arrangement comprising:
   a support structure comprising an upper cavity and a lower cavity;
   a needle bearing within said upper cavity;
   a tapered roller bearing within said lower cavity;
   a king pin mounted within said needle bearing and said tapered roller bearing for rotation about an axis, a step defined in said king pin; and
   a spring cap mounted within said upper cavity, said spring cap exerting a force upon said king pin, said step for transferring said force to an axle beam.

2. The king pin arrangement as recited in claim 1, wherein said upper cavity and said lower cavity are threaded.

3. The king pin arrangement as recited in claim 1, further comprising an adjustment nut mounted within said lower cavity.

4. The king pin arrangement as recited in claim 3, wherein said adjustment nut supports said tapered roller bearing.

5. The king pin arrangement as recited in claim 1, further comprising a spacer between said tapered roller bearing and the location of an axle beam which will surround said king pin.

6. The king pin arrangement as recited in claim 1, wherein said support structure comprises a steerable knuckle.

7. The king pin arrangement as recited in claim 1, wherein said tapered roller bearing is tapered in a direction moving away from said upper cavity.

8. The king pin arrangement as recited in claim 1, further comprising a spring cap mounted within said upper cavity, said spring cap exerting a force upon said king pin toward said tapered roller bearing.

9. The king pin arrangement as recited in claim 1, wherein an upper segment of said king pin is of a larger diameter than a king pin segment which is to be received into the axle beam.

10. A steerable knuckle assembly comprising:
    a steering knuckle comprising an upper cavity and a lower cavity;
    a needle bearing within said upper cavity;
    a tapered roller bearing within said lower cavity;
    a king pin mounted within said needle bearing and said tapered roller bearing for rotation about an axis, a step defined in said king pin; and
    a spring cap mounted within said upper cavity, said spring cap exerting a force upon said king pin, said step for transferring said force to an axle beam.

11. The steerable knuckle assembly as recited in claim 10, wherein said upper cavity and said lower cavity are threaded.

12. The steerable knuckle assembly as recited in claim 10, further comprising an adjustment nut mounted within said lower cavity.

13. The steerable knuckle assembly as recited in claim 10, further comprising a spacer between said tapered roller bearing and an axle beam.

14. The steerable knuckle assembly as recited in claim 10, wherein said tapered roller bearing is tapered in a direction away from said upper cavity.

15. The steerable knuckle assembly as recited in claim 10, wherein an upper segment of said king pin is of a larger diameter than a king pin segment which is to be received into the axle beam.

16. A king pin arrangement comprising:
    a support structure comprising an upper cavity and a lower cavity;
    a needle bearing within said upper cavity;
    a tapered roller bearing within said lower cavity; and
    a king pin mounted within said needle bearing and said tapered roller bearing for rotation about an axis, an upper segment of said king pin received within said needle bearing, said upper segment of said king pin of a larger diameter than a king pin segment which is received into said tapered roller bearing.

17. A steerable knuckle assembly comprising:
    a steering knuckle comprising an upper cavity and a lower cavity;
    a needle bearing within said upper cavity;
    a tapered roller bearing within said lower cavity;
    a king pin mounted within said needle bearing and said tapered roller bearing for rotation about an axis, an upper segment of said king pin received within said needle bearing, said upper segment of said king pin is of a larger diameter than a king pin segment which is received into said tapered roller bearing; and
    a spring cap mounted within said upper cavity, said spring cap exerting a force upon said king pin.

\* \* \* \* \*

UNITED STATES PATENT AND TRADEMARK OFFICE
CERTIFICATE OF CORRECTION

PATENT NO. : 7,093,843 B2
APPLICATION NO. : 10/437709
DATED : August 22, 2006
INVENTOR(S) : Varela et al.

It is certified that error appears in the above-identified patent and that said Letters Patent is hereby corrected as shown below:

Claim 17, Column 4, line 47: Please delete "is".

Signed and Sealed this

Twenty-first Day of November, 2006

JON W. DUDAS
*Director of the United States Patent and Trademark Office*